March 31, 1942.  J. S. CLAPPER  2,277,844
POWER-DRIVEN MOWING MACHINE
Filed Feb. 26, 1940  6 Sheets-Sheet 1

FIG. 1

INVENTOR
JOHN S. CLAPPER

ATTORNEYS

March 31, 1942.   J. S. CLAPPER   2,277,844
POWER-DRIVEN MOWING MACHINE
Filed Feb. 26, 1940   6 Sheets-Sheet 3

INVENTOR
JOHN S. CLAPPER

By Paul, Paul & Moore
ATTORNEYS

March 31, 1942.  J. S. CLAPPER  2,277,844
POWER-DRIVEN MOWING MACHINE
Filed Feb. 26, 1940    5 Sheets-Sheet 5

INVENTOR
JOHN S. CLAPPER

By Paul, Paul & Moore
ATTORNEYS

March 31, 1942.  J. S. CLAPPER  2,277,844
POWER-DRIVEN MOWING MACHINE
Filed Feb. 26, 1940  6 Sheets-Sheet 6

INVENTOR
JOHN S. CLAPPER
By Paul, Paul & Moore
ATTORNEYS

Patented Mar. 31, 1942

2,277,844

UNITED STATES PATENT OFFICE 2,277,844

POWER-DRIVEN MOWING MACHINE

John S. Clapper, Minneapolis, Minn., assignor to Toro Manufacturing Corporation of Minnesota, Minneapolis, Minn., a corporation of Minnesota Application February 26, 1940, Serial No. 320,902

6 Claims. (Cl. 56—25)

The present invention relates to mowing apparatus of the motor driven transport type and more particularly to improvements in such apparatus for facilitating the use of such mowers.

In transport mowers, it is customary to provide means for elevating the mowing units into transporting positions, and where the cutting unit is of the sickle bar type, into upright position. In the problem of roadside sickle bar mowing, particularly, it is essential to provide for rapidity of elevation of the sickle bar for clearing obstacles, and also desirable to provide means for changing by small increments the angular position of the sickle bar to accommodate changes in bank or ditch slope or to clear obstacles.

In the present invention, rapid elevation, lowering, and adjustment of the position of mowing units with reference to the transport vehicle is accomplished by mechanical power means with a minimum number of controls, whereby expeditious operation is obtained.

It is therefore an object of the present invention to provide a power driven mowing machine having power means for raising and lowering the mowing units.

It is also an object of the invention to provide a power driven mowing machine having ground wheel operated mowers and a sickle bar mower, which are selectively operable, and elevating mechanisms therefor all operated from a unitary power take-off transmission.

It is a further object of the invention, in a mowing machine, to provide a power driven hoist with a single control for raising and lowering one or a number of units.

It is also an object of the invention to provide means whereby one lifting motion imparted to a sickle bar about a pivot adjacent to the sickle head, as by a horizontally disposed tension member connected to a lifting arm that extends upward from the bar and pivot, will, upon actuating the bar to an upright position, at the same time lift the sickle head and pivot to a higher elevation from the ground than in cutting position.

It is likewise an object of the invention to support the sickle head from the vehicle when desired, and to hold the skid plate thereof off from the ground at a distance readily adjustable from the vehicle, whereby the skid plate may be made to clear curbs, and other obstructions of approximately uniform height, which occur along the edges of highways.

Other objects of the invention are those inherent in the apparatus herein illustrated, described and claimed.

The apparatus is shown in the drawings in which—

Figure 6 is a fragmentary sectional plan view along the line 6—6 of Figure 5. In Figure 6, a sectional line 5—5 shows the point from which the upper portion of Figure 5 is viewed.

GENERAL ORGANIZATION

The general plan of the invention comprises a tractor transport vehicle generally designated 10 (Figure 1) having a motor 11, a front axle 12 having steerable front wheels 13 and 14, and rear driving axle 16 upon which is mounted rear driving wheels 17 and 18. The vehicle includes a chassis frame consisting of side members 20 and 21, and a rear cross-frame member 22. The motor compartment 11 includes a transmission compartment 23, which is connected by means of a suitable drive shaft 24 to the rear axle differential housing 25.

Grouped upon the vehicle are a plurality of mowing instrumentalities which may be of diverse sorts. In the embodiment of the invention illustrated in Figures 1 through 9, there are provided ground wheel driven mowing units A, B and C, which accomplish ordinary grass cutting operation by means of a revolving reel cutter, not illustrated, on each of the units. In themselves, these units are conventional and include a cutting reel driven from ground engaging drive and supporting wheels. In addition, at the right side of the vehicle and somewhat forward of center, there is mounted a sickle bar cutting instrumentality S, which is power-driven from the motor 11 of the tractor transport vehicle 10.

Each of the mowing units A, B and C is attached to the propelling vehicle 10 by means of a cross drawbar hitch generally designated 30.

The hitches for the units are preferably constructed and are made so as to permit universal vertical and horizontal swinging movements of the mowing unit. For purpose of illustration, there is shown a crossed drawbar hitch, in which 31 and 32 are the crossed bars having universal connection at 38 and 39 to the bracket on the vehicle, and universal connection at 34 and 35 to the vehicle chassis, are accompanied by a vertical clearance from each other at the crossing point, and are not interconnected. Displacements of the mower unit in a vertical plane, relative to the vehicle chassis, are accomplished by a vertical swinging motion having an effective radius K, whereas displacements in a horizontal plane are around the imaginary point 42 where the cross drawbars intersect, the effective radius being the distance D.

The head of the sickle bar has ground support upon a skid plate 50 and pivotally engages swing frame generally designated 51, which extends upwardly toward the vehicle 10 where it is connected at 52 to a longitudinal frame member 53. The member 53 is in turn mounted by means of brackets 54 and 55 upon the shaft 56. The shaft 56 is mounted at its forward end in the front cross frame member 57 of the vehicle 10, and at its rearward end is mounted upon an intermediate cross frame member 58. The skid plate 50 engages arm 60, which is rigidly joined by bars 61 and 62 as an integral part of swing frame 51, connected at 52.

The entire sickle bar mowing unit is accordingly free to move in a vertical plane about shaft 56. Horizontal movement is prevented by a tow bar 64, which is connected to the swing frame arm 60 at 65 and is hooked into a hole 66 upon the longitudinal frame member 53.

Figure 3:
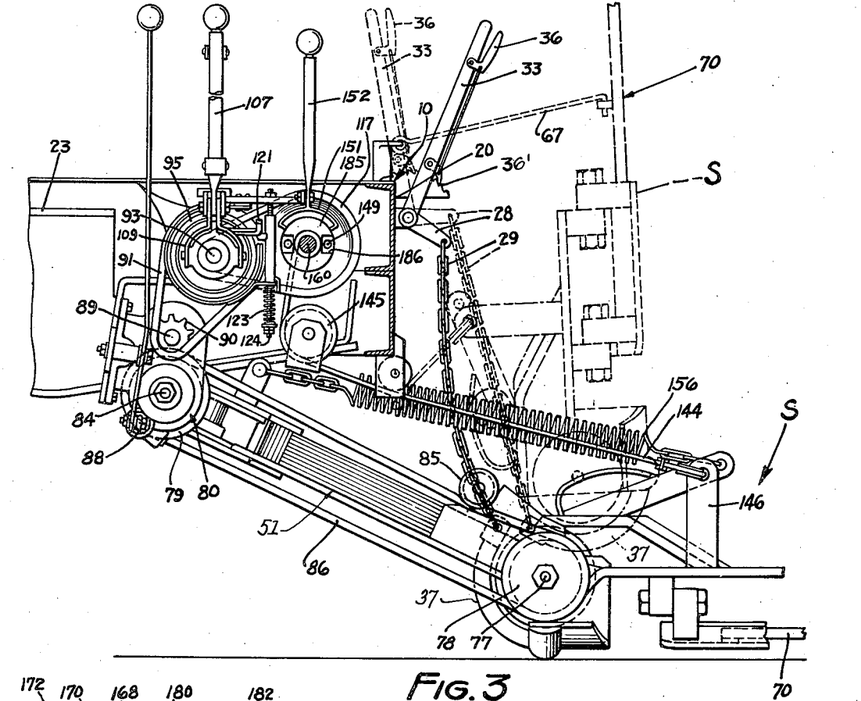
Figure 3 is a fragmentary elevational view partly in section along the lines 3—3 of Figure 2.

The sickle bar, generally designated 70, is pivotally mounted at 71 and 71' upon swing frame 51 and may be elevated to vertical position and raised as shown in the dotted lines of Figure 3, where it may be supported by hook 67.

Alongside the frame 10 of the vehicle, there is pivotally mounted a rock shaft 26, the forward end of which is journalled upon a post 27 attached to the frame of the vehicle. The forward end of the shaft carries a short arm 28 to which a chain 29 is attached. The chain extends downwardly and is attached to an arcuate horn 37 extension from the sickle bar unit 70. The rear end of shaft 26 is journalled in a detent quadrant plate 30 and there is provided a lever 33 extending upwardly from the shaft 26. The lever has a detent release grip 36 which serves to lift detent pawl 36' whereby the lever 33, shaft 26 and arm 28 may be positioned as desired. The lever 33 is illustrated in full lines in the position used when mowing over turf. When mowing along highways it is often desired to elevate the sickle bar assembly a slight distance above the pavement, and this is accomplished by moving the lever toward the dotted line position whereby arm 28 is rotated upwardly, the slack is taken out of chain 29 and the sickle assembly as a whole is elevated.

A different action, however, occurs when the sickle bar is angularly elevated. This will be explained more fully hereinafter.

The sickle bar 70 is provided with blade 73, which is oscillated in the toothed bar 74 by means of a pitman link 75 connected to pitman wheel 76. The pitman wheel is carried by shaft 77 mounted in journal 71. At the rear end of the pitman shaft 77, there is mounted a double grooved pulley 78, which is aligned with a similar pulley 79 upon the power take-off drive generally designated 80.

Figure 5:
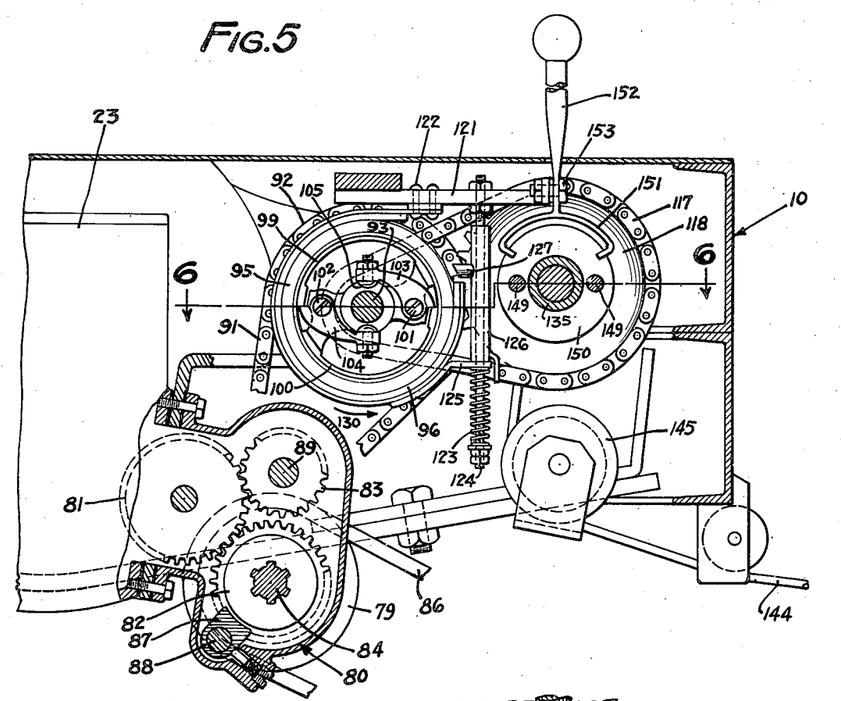
Figure 5 is an enlargement partly in section of the power transmitting and gear shifting apparatus along the line 5—5 of Figures 2 and 6.

The power take-off is best illustrated in Figure 5 and consists of a gear wheel 81 driven from the transmission 23 of the propelling motor on the tractor. Gear 82 is mounted upon a spined shaft 84 and may be moved axially along the shaft by means of fork 87 on shift rod 88. When moved into meshing engagement with gear 81, gear 82 is rotated, and accordingly drives the shaft 84 and pitman drive pulley 79 mounted thereon. Gear 83 is instantly meshed with gear 81 and constantly rotates shaft 89 and sprocket 90 thereon.

Between the pulleys 78 and 79, there is provided a belt tightener 85, which serves to apply a constant tension upon the V-belts 86. When gear 82 is moved out of engagement with gear 81, which is accomplished by means of the slide block 87 upon slide shaft 88, the drive to the sickle is accordingly interrupted, but since the gears 83 and 81 are engaged, the power supply to shaft 89 is continuous.

Mowing unit hoists

Figure 6:
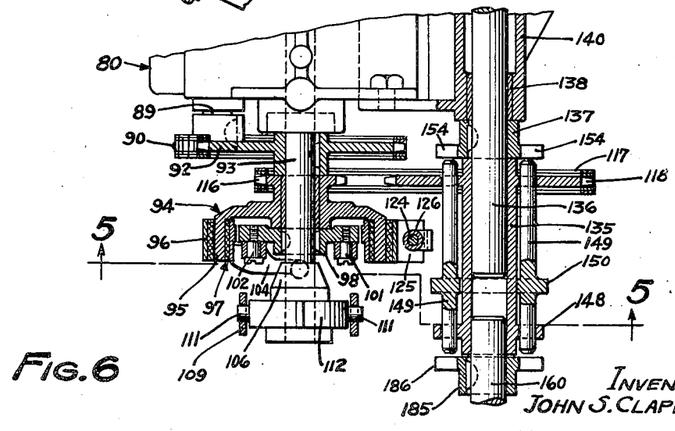

The shaft 89 protrudes from the power take-off transmission 80 and carries a sprocket wheel 90, which is connected by means of a drive chain 91 to the sprocket wheel 92 illustrated in Figures 5 and 6.

The sprocket wheel 92 is keyed to shaft 93, and serves to drive the shaft and a clutch member 98. Adjacent the wheel 92, there is a combined brake-clutch-drive gear member generally designated 94, which is mounted for free rotation upon the shaft 93. The member 94 has a brake drum shaped surface 95 against which an outer brake drum 96 is applied, and an inner clutch surface, against which a clutch member generally designated 97 operates. The clutch consists of a hub and web part 98, which is keyed to and accordingly rotates with the shaft 93. Opposite ends of the web have integrally formed semi-circular clutch faces formed thereon, which are faced with clutch friction material. The semi-circular clutch pieces have free ends and the entire unit is circumferentially expansible to cause the clutch friction material to engage the inside of the drum 95. To accomplish the expansion, there are two lever arms 103—104 pivotally mounted on the web. One end of each lever arm bears against the adjacent free end of the semi-circular clutch part, while the other ends of the lever arms are fitted with rub buttons which are adapted to be forced outwardly by means of conical surface 106.

Figure 7:
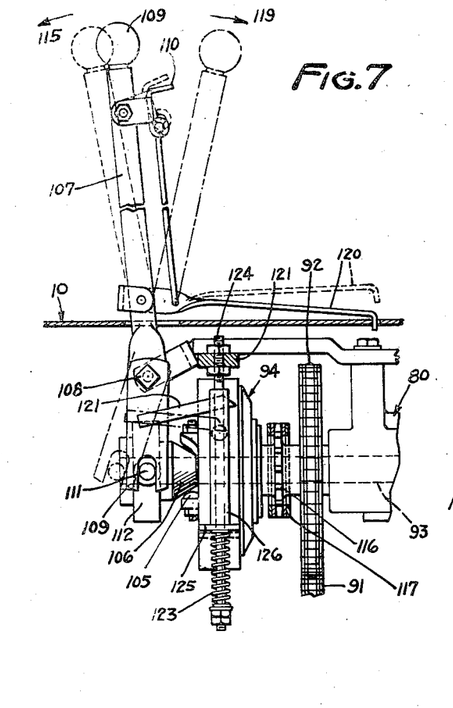
Figure 7 is an enlarged fragmentary view along the line and in the direction of arrow 7—7 in Figure 2.
Figure 8:
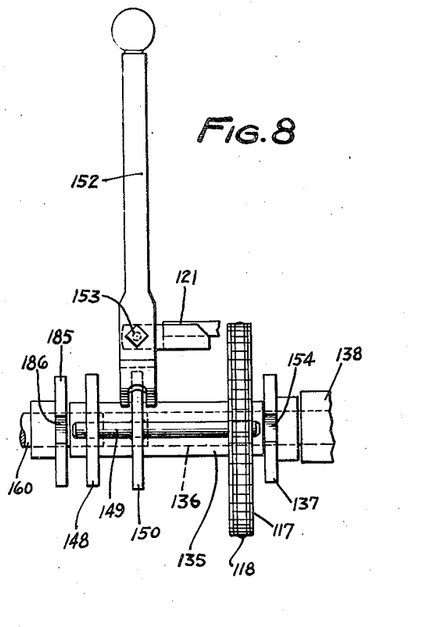
Figure 8 is a fragmentary elevational view along the lines 8—8 of Figure 2.

The cone 106 is slidable endwise upon shaft 93 and is arranged to be operated by means of a lever 107, which is pivoted upon bolt 108 upon the frame (see Figure 7). The lever 107 extends upwardly and has a hand knob 109 and a lock operating finger 110. The lower ends of the lever 107 are bifurcated as shown at 109 so as to engage the stub shafts 111 of the clutch cone shifting collar 112, the latter being rotatable with respect to the clutch cone. As the lever 109 is moved in the direction of arrow 115, i. e., to the dotted line position, the clutch cone 106 is driven against the rub buttons 105. The buttons are accordingly forced outwardly and swing the levers 103 and 104 about the screws 101 and 102. The outwardly extending ends of the levers bear against the ends of the expansible clutch ring, and the ring is accordingly expanded circumferentially into engagement with the member 95. Since the clutch ring is keyed to and rotated with shaft 93, the member 95 is accordingly rotated, and the sprocket 116 mounted thereon drives chain 117 and accordingly drives large sprocket 118, best seen in Figures 5 and 6.

On the outer surface of member 95, there is mounted a brake band 96, which is fixedly attached to the frame member 121 by means of rivets 122. The brake band is arranged to be drawn upwardly by means of a spring 123, which is mounted upon the rod 124. The brake is accordingly self-energizing when the member 96 is rotated in the direction of arrow 130 (Figure 5), but does not prevent the member 95 from being driven in the opposite direction, which is the normal "hoisting" rotation of shaft 93 and the clutch parts thereon. When in the neutral position, the cone 106 is sufficiently withdrawn so that the clutch surfaces 99 and 100 are not in engagement with the member 95 and the latter is accordingly not rotated in "hoisting" direction. At the same time, the brake is effective and the member 95 is held against "lowering" rotation in the direction of arrow 130.

It therefore follows, that a lifting apparatus actuated by sprocket 118 can be made to lift weight whenever cone 106 is operated by lever 107 in the direction 115 to engage the clutch mounted on shaft 93. When the lever is returned to neutral position, reverse rotation of sprockets 116 and 118 is prevented by a self-energizing brake now to be described.

Above the clip 125, which is attached to the brake bands, there is a tubular member 126 having an outwardly extending finger portion 127. In order to release the member 95 for "lowering" rotation in the direction of arrow 130, the operating knob 109 and lever 107 are moved in the direction of arrow 119, i. e. to the position represented by dot and dash lines in Figure 7, by first lifting the finger piece 110, which in turn lifts the locking member 120 so that the lever may be moved from the neutral position shown in full lines. The lever 107 may then be moved to the position shown in dot and dash lines (Figure 7), in which position the side piece 121 on the lever engages the finger 127 on the tubular portion 126 and forces the latter downwardly against the action of spring 123. This releases brake 96 and permits the member 95 to rotate in the "lowering" direction of arrow 130. As the member thus rotates, it also permits a corresponding turning of sprocket 116 and large sprocket 118, which is attached thereto by means of chain 117. This movement of lever 107 to engage the clutch, thereby to cause rotation in one direction, or to release the brake, thereby to permit rotation in the other direction, controls the raising and lowering of both the sickle bar S or the group of mowing units A, B and C, as described below.

Sickle bar hoist

The sprocket 118 is provided with an enlarged hub portion 135, which is freely journalled upon the shaft 136. The shaft 136 in turn carries a collar plate 137, which is keyed to the shaft and the shaft and collar plate are journalled for rotation in bearing 138 in the power hoist frame member 140. The forward end of shaft 136 is journalled in a pillow block 141, upon side frame member 142, and carries thereon a winding apparatus consisting of a pair of spaced plates 143, these being slightly chamfered so as to permit easy entrance of the hoisting cable 144, which is accordingly wound in the space between the plates. The cable extends downwardly over pulley 145, and thence to the bracket 146 on the sickle bar carrying frame. The web of sprocket 117 is apertured and the hub 135 of sprocket 118 is provided with a small web 148, which is similarly apertured. The apertures receive a pair of sliding rods 149 which are fastened together with simultaneous movement by means of an encircling flange 150. The flange 150 is arranged to be engaged by the fork 151 attached to hoist shift lever 152, so that when the lever 152 is moved in the rearward direction with reference to the motor vehicle, the fork 151 is moved forwardly being below the pivot 153. The rods 149 are accordingly moved forwardly from the apertures in web 148 and through the web of sprocket 118, and engage apertures 154 in the collar 137 thereby to drive the collar. Since the collar is keyed to the shaft 136, the latter is rotated and accordingly rotates the cable winding apparatus 143 thereby elevating the sickle bar with pivotal motion about 71 and 71'. The large spring 156 is provided between the sickle bar and the frame 151, upon which the sickle bar is mounted. The spring 156 serves to reduce the amount of force necessary for elevating the sickle bar.

During angular elevation of the sickle bar 70, a two-fold action takes place, by virtue of the horn 37 attached to the sickle bar and the chain 29 which connects to the adjustable lever arm 28. As the sickle bar is elevated, it rotates the free end of horn 37 downwardly and as a result any slack in chain 29 is taken up. Then with chain 29 taut, further hoisting force on cable 144 moves the swing frame 51 upwardly. As a result, the sickle bar is raised, not only angularly, but also vertically to the position shown in the dotted lines.

Multiple mower hoist

Figure 1:
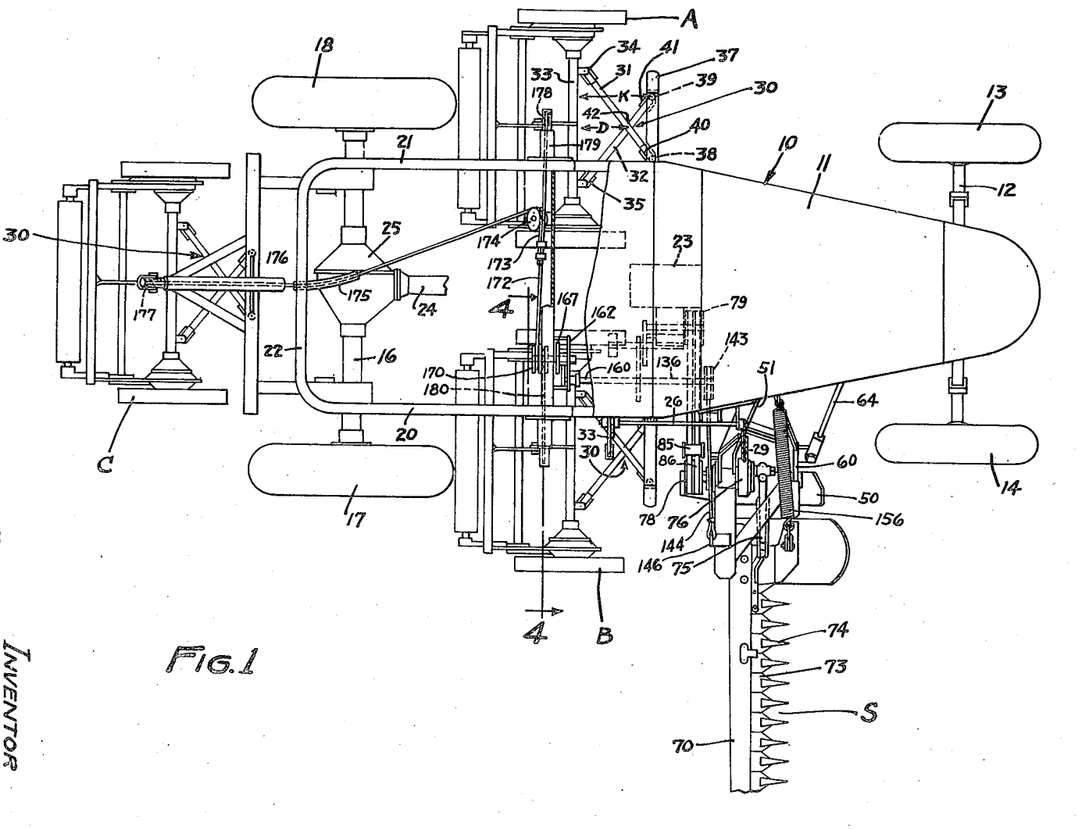
Figure 1 is a plan view partly in section of the mowing apparatus.
Figure 2:
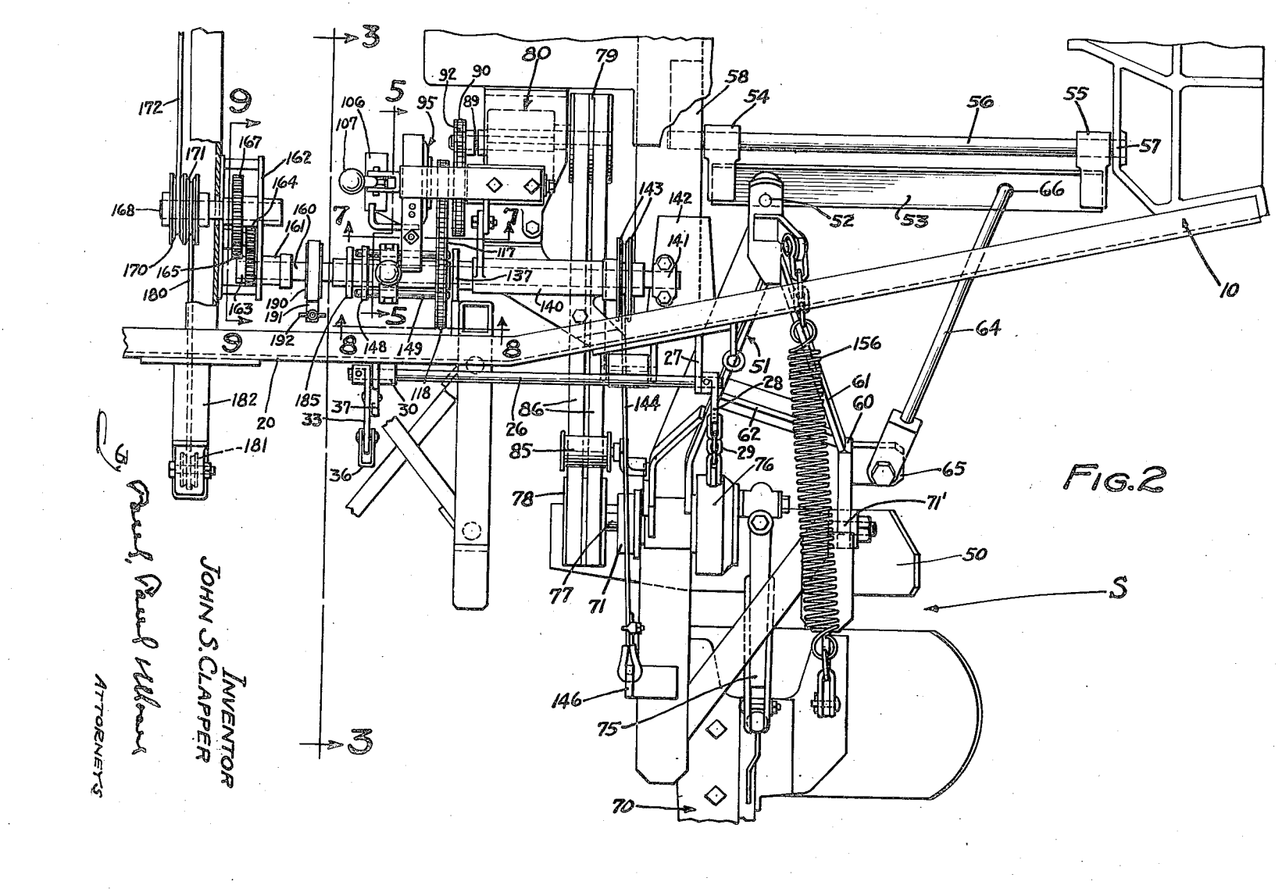
Figure 2 is a plan view of an enlarged fragment of the central mid-frame portion of the apparatus shown in Figure 1. In this figure, portions of the apparatus are broken away and other portions omitted for purposes of clarity.
Figure 4:
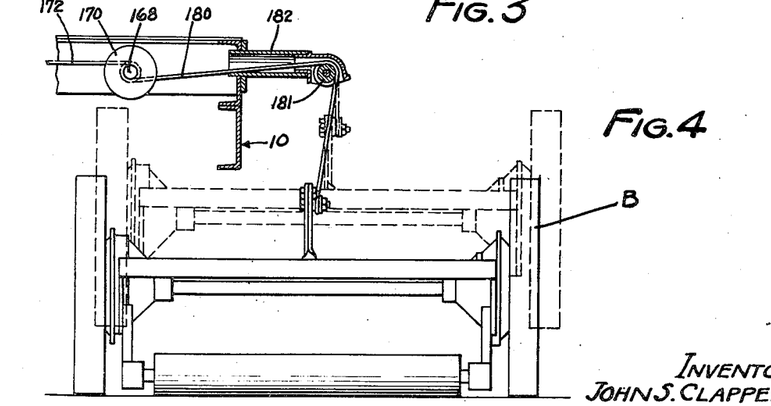
Figure 4 is a fragmentary elevational view showing one of the mowing units partly in section, along the lines 4—4 of Figure 1.
Figure 9:
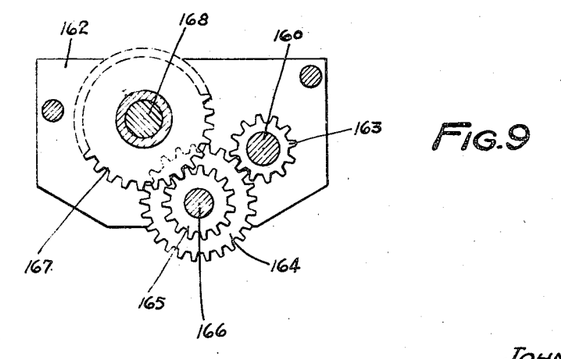
Figure 9 is a sectional view of a fragment of the apparatus taken along the line 9—9 of Figure 2.

Within the rear portion of the hub 135 of sprocket 118, there is journalled a shaft 160. Shaft 160 is free to turn in the hub, which accordingly forms a bearing for the shaft. The rear end of shaft 160 is journalled at 161 in the frame 162 and carries a gear 163 as shown in Figures 2 and 9. The gear 163 engages a larger gear 164, which has integrally formed with it a companion small gear 165. The gears 164 and 165 are unitary and rotate upon idler shaft 166. The gear portion 165 engages the gear 167, which is mounted upon the forwardly extending end of shaft 168. The rear end of shaft 168 is provided with two winding grooves 170 and 171, which are similar to the winding groove 143 previously described, though somewhat smaller. Upon the winding groove 170, there is wound a cable 172, which extends transversely across the frame and is connected to a branch cable 173 as shown in Figure 1. The branch cable is operated over a pulley 174 and thence through guide tubes 175 and 176 to the pulley 177 immediately above mowing unit C. The cable 172 extends directly across the mower to a similar pulley 178 upon the outwardly extending end of the guide tube 179, and thence downwardly to the mowing unit A. Upon the drum 171, there is similarly wound a cable 180 which extends outwardly to the pulley 181 mounted in the guide tube 182 upon side frame members 20, as shown in Figure 4. The position of pulley 181 is over mowing unit B and the cable 181 extends downwardly and is attached to the mowing unit B.

As shaft 163 is rotated, the winding grooves 170 and 171 are rotated at a much reduced rate. The cables 172 and 180 are wound and accordingly serve simultaneously to elevate all of the mowing units. Upon the forward end of the shaft 160, there is provided a collar and flange arrangement 185 (identical with that shown at 137—154, immediately in front of sprocket 118). The collar 185 has a flange 186, which is provided with openings for receiving the rods 149, when they are shifted backwardly by means of a lever 152. When this occurs, the drive is from the sprocket 117 through the rods 149—149 to the collar 186, and thence through shaft 160 to the winding grooves 170—171.

Intermediate between the collar 186 and bearing 161, there is provided a brake drum 190, which is provided with a brake band 191. The latter may be tightened by means of the wing screw 192 so as to prevent shaft 160 from rotating.

Operation

It is assumed that mowing units A, B and C are in the elevated position and are held in the elevated position by brake band 191 being tightened upon the brake drum 190. This serves to prevent rotation of the winding drums 170 and 171, and the winding drums in turn serve to hold the cables 172—173—180 from being played out and accordingly the mowing units A, B, and C are maintained in elevated condition.

It is also assumed that the sickle bar mowing unit S is in elevated condition, and is maintained at elevated condition by means of hook 67.

The gear 82 may be either in engagement or out of engagement with gear 81 and the pitman drive pulley 79, and pitman drive shaft 77 and pitman wheel 76 may be either operative or non-operative while the sickle bar is in the vertical position. Operation in the vertical position is useful, as where the mowing machine is used for hedge trimming.

Since gear wheel 83 is constantly engaged with gear 81, shaft 89 and sprocket 90 are constantly rotated and serve to rotate the sprocket wheel 92 and shaft 93.

It is assumed that shaft lever 152 is moved backwardly so as to move the rods 149 into engagement with the forward collar 137 on shaft 136. The hook 67 is then released, but the sickle bar does not rotate downwardly even though stress is placed upon the hoisting cable 144 due to the fact that lowering movement tends to cause rotation of the winding drum 143, and brake member 95 in the direction of arrow 130 (see Figure 5). Since the brake 96 is self-energizing due to the action of spring 123, the member 95 is prevented from rotating. The operator then moves the operating lever 107 forwardly in the direction of arrow 119 and this accordingly moves the finger 121 into engagement with the lug 127 and this serves to loosen the brake band 96, thus permitting brake drum 95, sprocket 118 and the shaft 93 to rotate in the "lowering direction" thus playing out the hoisting cable 144 until the sickle bar mowing unit has reached the desired elevation.

When it is desired to elevate the sickle bar S, the operating lever 107 is drawn backwardly in the direction of arrow 115 thus forcing the cone 106 into engagement with rub buttons 105. This expands the clutch surfaces 99 and 100 outwardly into engagement with the interior of brake-clutch drum 95 and the latter is rotated. The brake drum rotates sprockets 116 and the latter rotates sprocket 118 upon shaft 136 so as to wind the hoist cable 144. As the operating lever 107 is moved to the neutral position shown in full lines, Figure 7, the clutch cone 106 is withdrawn sufficiently to stop the drive, and the sickle bar tends to unwind the cable and move the brake drum 95 in the direction of arrow 130, but since the brake 96 is applied automatically, the sickle bar is held in elevated condition.

It will thus be apparent that the operator of the mower can raise and lower the sickle bar very expeditiously, simply by moving the lever 107 forwardly and backwardly, respectively, and the operator is thus enabled expeditiously to elevate the sickle bar to clear roadside objects and to adjust the angular position of the sickle bar for changes in bank slope.

When it is desired permanently to elevate the sickle bar, this is accomplished by angularly elevating and then lifting the sickle bar to the angular position shown in the dotted lines in Figure 3, the vertical lift of the sickle bar being accomplished by the interaction of chain 28 and horn 37 as previously described. Hook 67 is then applied and lever 107 moved forwardly so as to release the brake 96. This releases the strain on the hoisting cable and the shift lever 152 is then moved into neutral position or to the rear position (see Figure 6) into engagement with notches 186 of collar 185 for lowering the mowing units A, B and C. After the lever 152 has been moved so as to slide the rods 149—149 into driving engagement with the notches 186 of collar 185, wing nut 192 of brake 190 is unscrewed so as to release the brake band 191. This accordingly permits the weight of the mowing units A, B and C to apply an unwinding force upon shaft 160 and thence through large sprocket 118 and small sprocket 116 to the brake band 96, which being self-energized sustains the mowing units A, B and C in elevated condition. Operating lever 107 is then moved forwardly so as to release brake band 96 as previously described and the mowing units A, B and C are simultaneously lowered into contact with the surface to be mowed. The lowering movement is continued sufficiently so as to provide sufficient slack in cables 180, 172 and 173 to permit undulating movement of the mowing units during grass cutting operation.

When it is desired to elevate the mowing units A, B and C as during transportation, the lever 107 is moved backwardly in the direction of arrow 115 thus forcing the clutch surfaces 99—100 against the inner sides of clutch-brake drum 95 as previously described. This applies power to sprocket 116 and large sprocket 118, and then through rods 149—149 to shaft 160, which rotates the gear train shown in Figure 9, and accordingly rotates the winding grooves 170—171 to elevate the mowing units. The lever 107 is moved to neutral position shown in full lines in Figure 7, and brake band 96 is automatically applied and prevents backward rotation of the winding grooves 170—171. As a result, the mowing units are maintained in elevated condition. If the mowing units are thereafter soon to be lowered, it is unnecessary to tighten brake band 191 upon brake 190 since the mowing units are maintained by the action of brake 96. However, if the mowing units are to be maintained in elevated condition for sometime as when the mowing machine is used for sicklebar mowing, the brake 191 is applied by screwing down the wing nut 192. The lever 107 is then moved forwardly in the direction of arrow 119 so as to release brake 96 and since this removes the driving stress upon rods 149 they may easily be moved out of engagement with the notches in flange 186 by operation of the lever 152.

*Self-powered sickle bar mower*

Figure 10:
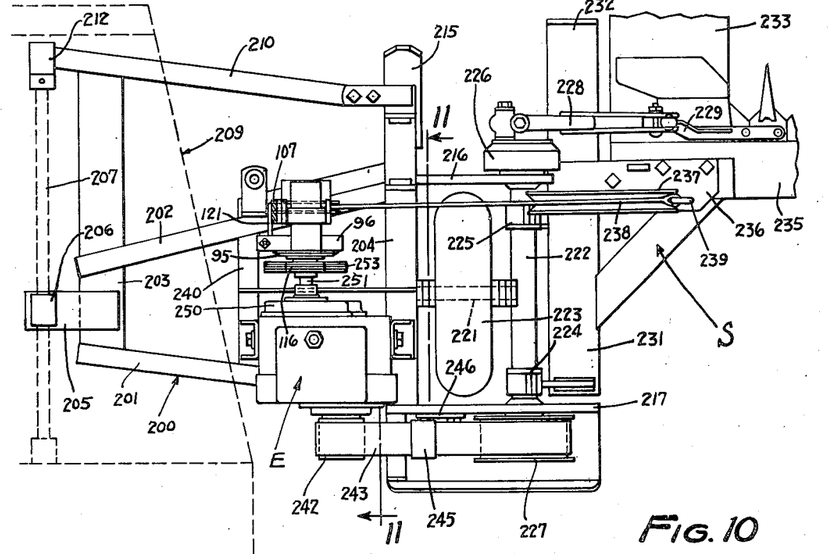
Figure 10 is a fragmentary plan view of a modified form of the invention, in which a sickle bar mower is independently powered and furnished with a power-operated sickle bar lift.
Figure 11:
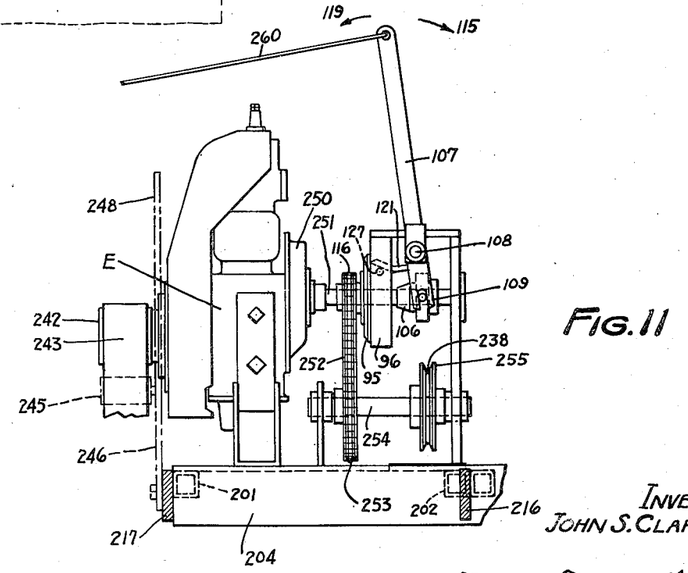
Figure 11 is a fragmentary side elevational view of the modified form of the invention shown in Figure 10. This figure is a view taken along the line 11—11 of Figure 10.

In Figures 10 and 11, there is illustrated a modified form of the invention in which the sickle bar mowing unit is self-powered and is mounted for movement alongside a tractor or truck which is the towing unit. This form of the invention comprises a main frame generally designated 200 composed of side frame members 201 and 202, which are joined together by a gusset plate 203 and longitudinal frame member 204. The gusset plate carries a pivot bracket 205, which is journalled at 206 upon the rod 207 longitudinally of the towing vehicle 209. The brace 210 is likewise journalled at 212 upon the rod 207, and is solidly fastened to the forward ends of frame members 203 and 204, so as to prevent tipping of the unit. The forward end of the frame member is likewise provided with a skid shoe 215.

Extending transversely from the frame member 204 are two transverse frame members 216 and 217, which are fastened together so as to constitute a rigid unity. A skid plate 219 is secured to the frame member 217 and has an upturned rear edge 218. The frame members 216 and 217 are connected together by tubular frame member 222. Between the frame member 204 and tubular supports 222, there is mounted an axle 221 upon which a single tired ground wheel 223 is journalled. The wheel 223 serves to support the weight of the sickle bar mower which is otherwise free to move toward the ground about the shaft 207 as an axis.

Outside of the tubular support 222, there is provided bushings 224 and 225, which serve as horizontal journals for the sickle bar mowing unit S, which is accordingly capable of being moved about the axis of tubular support 222, so that it may asume a vertical position. The inside of the tubular support 222 forms a journal for the pitman shaft upon which pitman wheel 226 and drive pulley 227 are mounted. A pitman link 228 connects the pitman wheel 226 and the cutter bar 229. The sickle bar frame includes a longitudinal frame member 231, which is turned upwardly at the forward end 232. Forwardly extending and upwardly turned deflector plate 233 is likewise provided upon the sickle bar. The toothed sickle bar 235 is bolted to the frame piece 236, and upon the top of the frame piece 236 there is mounted a raised elevating horn 237 to which the hoisting cable 238 is attached at eye 239.

Between the frame members 200 and 202, there is a longitudinal frame member 240 and upon this member and the longitudinal frame member 204, there is bolted a small internal combustion engine generally designated E. The engine has a drive pulley 242 at one end which serves to drive the pitman shaft pulley 227 through a suitable belt 243, which is arranged to be tightened by means of a belt tightener pulley 245, mounted upon the swinging arm 246. The arm 246 is pivoted to frame member 217 at 247, and has an operating extension 248, which may be operated from the tractor or truck 209 by suitable cable.

At the forward end of the engine E, there is a gear reduction box 250, and a slow speed drive shaft 251. The drive shaft 251 has journalled upon it a clutch and brake assembly identical with that shown in Figure 7. The clutch cone 106 is, as shown in Figure 7, arranged to be operated by an operating lever 107 and serves, when the lever 107 is moved in the direction of arrow 115 to engage the driving shoes of the clutch and brake drum 95 and thereby drives the small sprocket 116 all as previously described with reference to Figure 7. The sprocket 116 has a drive chain 252, which serves to drive a large chain sprocket 253, which is mounted upon rotatable shaft 254. Shaft 254 carries the cable winding grooves 255, which receives the hoisting cable 238.

At one side of the lever 107, there is provided the brake operating finger 121 in a manner identical with that shown in Figure 7. When the operating finger 121 is brought into contact with the lug 127, the brake band 96 is released and permits the cable 238 to be lowered under the influence of the weight of the sickle bar S, when the operating lever 107 is moved in the direction of arrow 119. It is to be understood, of course, that operating lever 107 of Figure 11 has a neutral position, a clutch engaging position, and a brake releasing position, all as described with reference to the identical device shown in Figure 7, and that the brake 96 is automatically applied and prevents the rotation of brake drum 95 in the reverse direction. The lever 107 is arranged to be operated by an operating rod 260 from the cab of the tractor or truck 209.

In operation, the motor E is started and the lever 107 moved in the direction of arrow 119 to release the brake 96 and thus permit the sickle bar unit to be lowered into mowing condition. The belt tightener lever 248 is then moved to tighten the belt 243, and the pitman shaft, pitman link and sickle bar are operated. When it is desired to elevate the sickle bar quickly, the lever 107 is moved in the direction of arrow 115 and power is automatically applied and rotates the winding groove 255. The sickle bar is thereby elevated. The sickle bar remains elevated due to the action of the self-energizing brake 96, which is operative when the clutch is in "neutral" to prevent movement in the reverse or sickle lowering motion. When it is desired to lower the sickle bar, the lever 107 is moved in the direction of arrow 115. This releases the brake and due to the weight of the sickle bar the hoisting cable is unwound from the winding groove 255.

Many obvious variations may be made in the apparatus described and illustrated without departing from the spirit of the invention claimed.

What I claim is:

1. A mowing machine comprising a tractor, a motor on said tractor for driving the same, a plurality of types of mowing units each type being mounted on said tractor for elevation from mowing position to an elevated position, hoist means on the tractor for each of said types of mowing units, a power take-off on the motor and a power transmitting drive for transmitting power to the hoist means of either type of mowing unit selectively, thereby to raise either type selectively.

2. A mowing machine, comprising a frame, a mowing unit mounted on said frame for movement from mowing position to an elevated position, a motor in said frame for operating the mowing unit, a power driven hoist for elevating the mowing unit, disconnectable power transmitting means between the hoist and motor, manually controlled means movable in one direction for connecting the hoist from the motor, and movable in another direction for disconnecting the hoist from the motor, a spring actuated friction brake for normally holding the hoist against reverse operation in any of its hoisting positions, and means connecting the manual means to said brake for moving the brake to non-braking condition when the manual means is moved in the direction for connecting the hoist and motor.

3. A mowing machine comprising a vehicle, a sickle bar assembly extending transversely from the vehicle, said assembly being mounted for vertical translatory movement and radial swinging movement in a vertical plane from a horizontal radial position to a vertical radial position, means mounted on the vehicle and connected to said sickle bar assembly for radially swinging the same from the horizontal to the vertical position, and additional means interconnecting the sickle bar assembly and the vehicle and operable when the sickle bar assembly is swung upwardly for moving the assembly upwardly.

4. A mowing machine comprising a vehicle, a swing frame pivoted upon the vehicle for radial swinging movement in a vertical plane transverse of the vehicle, a sickle bar assembly pivotally mounted on the swing frame for radial swinging movement in a vertical plane transverse of the vehicle, means for swinging the sickle bar radially with respect to the swing frame, and normally slack means interconnecting the sickle bar and frame and operated to be tightened when the sickle bar assembly is swung radially upwardly with respect to the swing frame for lifting the sickle bar assembly and swing frame upwardly.

5. A mowing machine comprising a vehicle, a swing frame pivoted upon the vehicle for radial swinging movement in a vertical plane transverse of the vehicle, a sickle bar assembly pivotally mounted on the swing frame for radial swinging movement in a vertical plane transverse of the vehicle, means for swinging the sickle bar radially with respect to the swing frame, connection means on the vehicle and tension link means interconnecting the sickle bar assembly and connections means, said tension means being tightened so as to lift the swing frame and sickle bar as the sickle bar is radially swung upwardly, said connection means being mounted for variable positioning with respect to the vehicle.

6. A mowing machine comprising a vehicle, a sickle bar carrying frame mounted on the vehicle for vertical elevating movement relative to the vehicle, a sickle bar pivotally mounted on the sickle bar carrying frame for radial swinging movement in a vertical plane transverse to the vehicle, said pivotal connection being at one end of the sickle bar, a segment mounted on the sickle bar, said segment extending under said pivotal connection and upwardly partially around said pivotal connection on a side opposite to said sickle bar, connection means between said segment and vehicle, and means for radially swinging the sickle bar upwardly.

JOHN S. CLAPPER.